A. A. SCOTT.
MOTOR VEHICLE.
APPLICATION FILED DEC. 9, 1915.

1,263,943.

Patented Apr. 23, 1918.
3 SHEETS—SHEET 3.

Inventor
Alfred A. Scott,
by Wilkinson, Guida Mosher
Attorneys

UNITED STATES PATENT OFFICE.

ALFRED ANGAS SCOTT, OF BRADFORD, ENGLAND.

MOTOR-VEHICLE.

1,263,943. Specification of Letters Patent. Patented Apr. 23, 1918.

Application filed December 9, 1915. Serial No. 65,963.

*To all whom it may concern:*

Be it known that I, ALFRED ANGAS SCOTT, a subject of the King of Great Britain, residing at Bradford, Yorkshire, England, have invented certain new and useful Improvements in Motor-Vehicles; and I do hereby declare the following to be a full, clear, and exact description of the invention, such as will enable others skilled in the art to which it appertains to make and use the same.

The present invention relates to improvements in motor vehicles.

The object of the invention is to provide a motor vehicle which shall be of great strength relative to its weight, which shall carry the rider in a low position, in which the chassis can also act as the body of the vehicle to carry the rider, in which the center of gravity is at a comparatively low point, in which the engine is so placed as to increase the compactness of the vehicle, which shall have great mobility, in which the chassis or frame is so constructed as to be built up of tubular members in triangulated relationship.

The invention is shown in the accompanying drawings in which:—

Fig. 4 is a detail view hereinafter referred to.

In carrying out the invention the vehicle is built up of side structures composed of triangulated members which are connected together by struts and diagonal members which themselves form triangulated structures with appropriate members of the side structures. The wheels of the vehicle are arranged, the rear ones to rotate about coincident axes and the front wheel arranged in alinement with one of the rear wheels, the engine being located approximately between this rear wheel and the front wheel in alinement therewith. The engine is built into the side structure on the side on which it is located so that its casing forms an integral part thereof. The rear wheels are connected to the chassis by springs to support the chassis and by radius rods, the radius rod on the side upon which the engine is located acting as a means for carrying the power transmission means from the engine to the rear wheel on the same side. The front wheel is connected to the chassis by means of a triangulated structure having a wide bearing on the front of the chassis, which triangulated structure extends sufficiently to the side to carry the front wheel in an offset position relative to the chassis, the structure being restrained by suitable springs.

Figure 1:
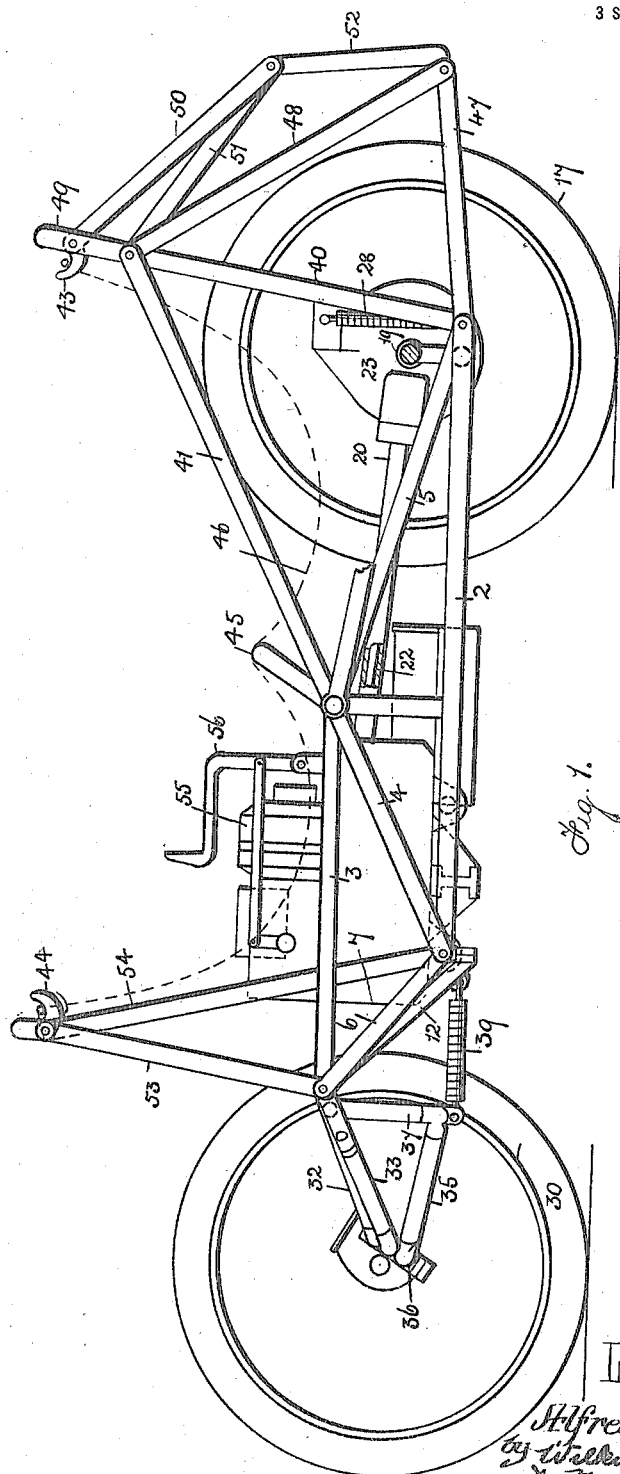
Figure 1 is an elevation of a machine constructed in accordance with the present invention with the near rear wheel removed.

As shown in the drawings the chassis or framework of the vehicle consists of side structures, the nearer side structure in Fig. 1 being composed of a lower horizontal member 2 and an upper member 3. The ends of the lower member 2 are connected by members 4 and 5 to one end of the member 3 while the upper ends of the member 3 are connected to the end of the lower member 2 by means of the member 4 previously mentioned and the member 6. The further side structure as shown in Fig. 1 is similarly constructed except that the engine casting 7 together with the lugs 8 and 9 shown in Fig. 2 substantially take the place of the members 3, 6 and 4 and the member 2 is shortened. The side structures are interconnected as regards the ends of the member 2 by diagonal members 10 and 11 and as regards the ends of the member 6 by the diagonal member 12 and cross strut 13. At the same time the corresponding angles or triangulated points of the side structures are interconnected by further cross struts 14, 15 and 16.

From the foregoing it will be seen that the main portion of the frame consists of triangulated side structures which are connected together by further triangulated side structures which lie in planes between the two side structures.

17 and 18 are two rear wheels of which 17 is the driving wheel. They are mounted on a common axis 19 and are connected to the main frame by means of radius rods 20 and 21. The radius rod 20 is pivoted to the engine casting 7 at a point just inside the same and carries in it a revoluble shaft 22 shown in Fig. 1, which connects up the engine with suitable bevel gear in the gear case 23 so transmitting the drive from the engine to the rear wheel 17. The forward end of this revoluble rod is connected at the end of the radius rod to the gear of the engine in any suitable manner.

Figure 2:
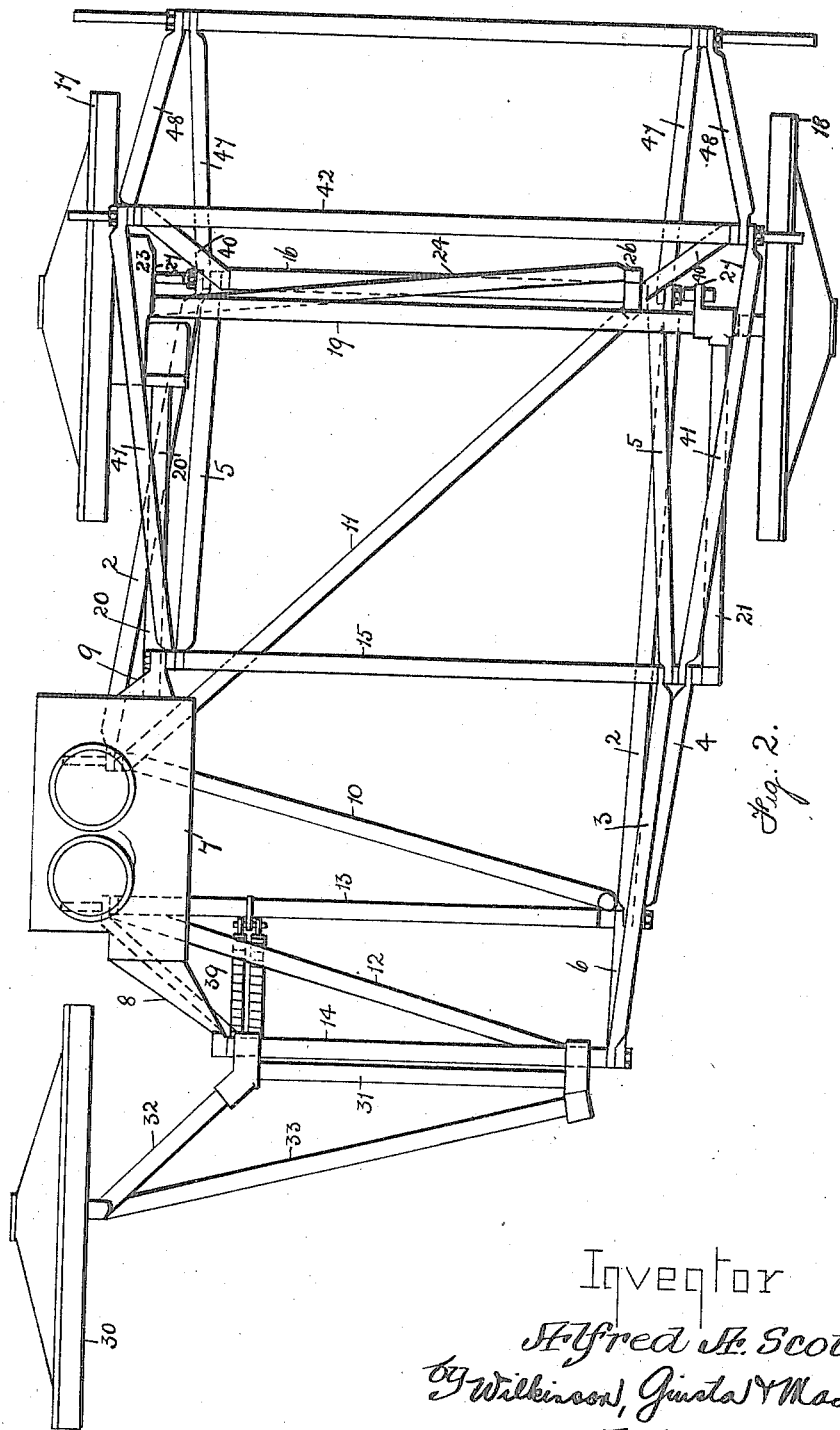
Fig. 2 is a plan view of the vehicle.
Figure 3:
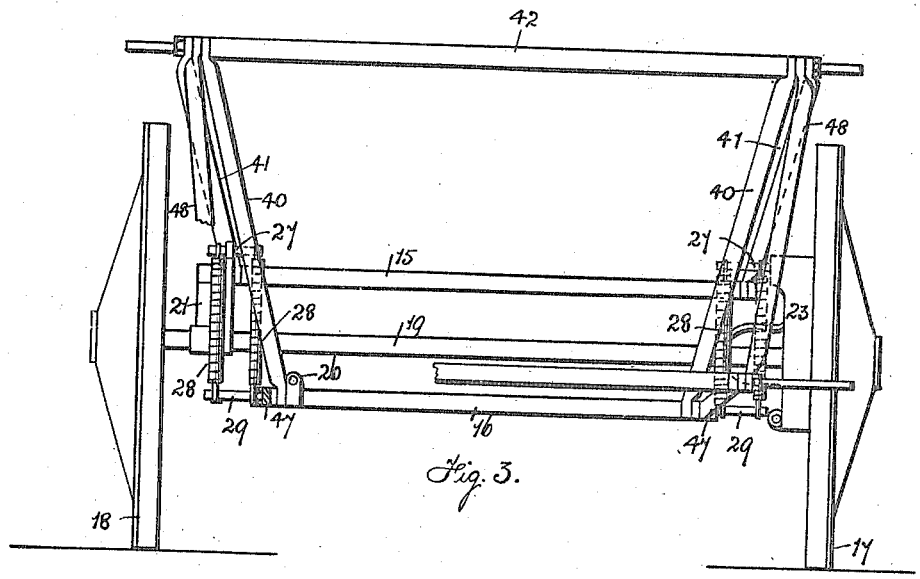
Fig. 3 is a rear end view, certain parts being broken off for clearness.
Figure 4:
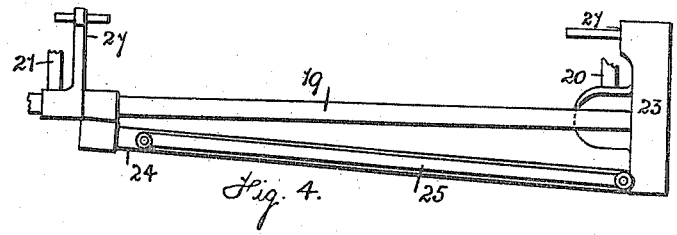
Figure 5:
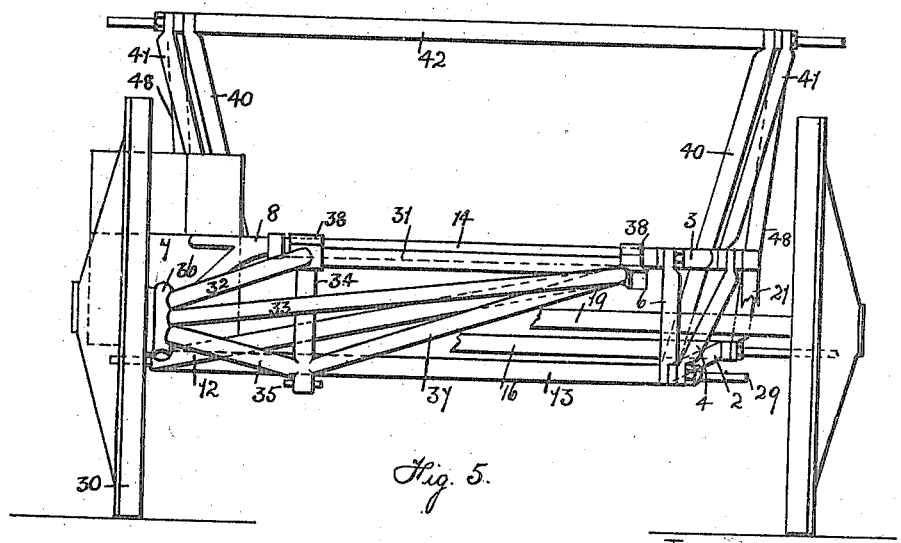
Fig. 5 is a front end view.

As shown in Figs. 2 and 5 the axle 19 is stayed by means of a strut 24 which together with the axle 19 and the gear case 23 forms a triangulated structure. In proximity to the junction of the gear case 23 and the strut 24 there is hinged a radius rod 25 (see Fig. 4) which at its other end is hinged to the main frame of the vehicle at the point 26 shown in Figs. 2 and 3. By this arrangement of radius rod it will be seen that the drive from the engine is easily communicated to the driving wheel 17 and that at the same time the frame or body of the vehicle is free to rise and fall relative to the wheels without interfering with the drive while the radius rod 25 prevents the rocking of the chassis or frame relative to the wheels.

Connected to the gear box 23 at the end of the radius rod 21 are suitable lugs 27 on which are suspended springs 28 connected to the main frame at the angles made by the members 5 and 2 of the side structures. As shown in the drawings these springs are actually connected to the extensions 29 of the transverse rod or member 16. The front wheel 30 is mounted on a double triangulated structure which is pivoted at the ends of the foremost cross strut 14 of the frame. This double triangulated structure consists of a member 31 parallel with the cross strut 14 and from the ends of which project members 32 and 33 forming a triangle with the member 31. At the junction of the members 31 and 32 there is a depending member 34 which at its lower end is connected by a further member 35 to the members 32 and 33. The members 32, 33 and 35 are united in an inclined socket 36 forming a bearing or trunnion about which the front wheel is turned for the purpose of steering. This socket 36 should be in alinement with the center line of the tread of the front wheel but is shown somewhat offset for the sake of clearness. This triangulated structure is further strengthened by means of a further member 37 connecting up the lower end of the depending member 34 and two members 31 and 33. The member 31 is pivoted to the cross strut 14 by means of suitable lugs 38. It will be seen that this triangulated structure when regarded in side view forms a bell crank lever pivoted about the cross strut 14. The depending member 31 is connected to the framework by more or less horizontally arranged tension springs 39.

By this arrangement it will be seen that the double triangulated framework connected to the steering wheel 30 is provided with a very wide bearing on the front of the framework and in fact a bearing the length of which is greater than the distance that the center of the wheel 30 is away in a transverse direction from the bearing itself. At the same time a very effective springing action is afforded by the arrangement of the springs 39 and the bell crank lever comprised in the manner above described.

By suitably forming the lug 8 connecting the engine to the cross strut 14 the engine casting 7 is brought into alinement with the front wheel 30 and the rear wheel 17 and this arrangement at the same time permits the front wheel 30 to have a very wide turning angle. As the engine casting 7 forms an integral part of one of the triangulated side structures and is at the same time stayed by the triangulated structure represented by the members 12 and 13 and 10 and 11 it is obvious that it will be prevented from setting up any twisting or bending strains on any of the tubes composing the main frame in its tendency to vibrate.

By means of approximately upright members 40 connected to the junction of the members 3, 4 and 5 and by a further member 41 it is possible to afford means for supporting a seat. These uprights 40 are connected together by a cross strut 42. By means such as lugs 43 and 44 shown in Fig. 1 and suitable supported cross bar 45 it will be seen that suitable means are provided for suspending a seat made of any suitable flexible material such as indicated by the dotted lines 46. By the double set of lugs 43 and 44 it will be possible to arrange the seat so as to have the face toward the front of the vehicle or toward the rear of the vehicle.

The width of the vehicle is preferably such that the seat will support two persons riding abreast. By means of the backwardly extending members 47 which extend from the rear of the members 2 and are connected to the uprights 40 by means of the members 48 it will be seen that suitable provision is made for supporting a luggage carrier or the like.

In the arrangement shown in the drawings the lugs 43 are shown mounted on extensions 49 of the uprights 40 which extensions are stayed by members 50, 51 and 52 which themselves together with the members 48 and the extension 49 form triangulated structures. These members are omitted from Fig. 2 for the sake of clearness.

If it be desired to be able to fix the seat to face the rear of the vehicle and utilize the lugs 44 these lugs are supported by upwardly extending members 53 and 54 connected together and at each side of the vehicle to the cross struts 14 and 13. The parts 53 and 54 are also omitted from Fig. 2 for the sake of clearness.

The parts indicated by 55 and 56 in Fig. 1 are parts of the engine which however do not form any part of the invention.

I declare that what I claim is:—

1. In a motor vehicle, a plurality of straight members in triangular relationship forming one side of the chassis, a further plurality of straight members in triangular relationship and an engine casting forming the other side of the chassis and struts arranged between corresponding points in triangular relationship in the two side structures formed from said pluralities of straight members.

2. In a motor vehicle, rear wheels, a front wheel in substantial alinement with one of said rear wheels, a chassis, a bracket hinged to the forward part of said chassis and forming a vertically-swinging lever, said hinged bracket extending to the side of the chassis and carrying said front wheel, and spring means for cushioning said hinged bracket.

3. In a motor vehicle, rear wheels, a front wheel in substantial alinement with one of said rear wheels, a chassis, straight members united in triangular relationship to form a bracket being in effect a bell-crank lever, means for pivotally uniting said bracket to the chassis, said bracket extending to one side of the vehicle and carrying said front wheel in alinement with one of the rear wheels.

4. In a motor vehicle in which the two rear wheels rotate about coincident axes and the front wheel is in alinement with one of the rear wheels, a chassis, means connecting said front wheel movably to said chassis consisting of straight members secured together to form a triple triangulated bracket, and spring means for controlling the movement of said connecting means relatively to said chassis.

5. In a motor vehicle having three wheels of which two rear wheels are located about coincident axes and the front wheel is in alinement with one of the rear wheels, a chassis, straight members united in triangular relation to form said chassis, a hinged structure at the front of said chassis connecting said front wheel thereto, straight members combined in triangular relation forming said hinged structure, and spring means between said chassis and hinged structure.

6. In a motor vehicle, a chassis, two rear wheels, an axle common to both said wheels, an engine, means for transmitting motion from said engine to one of said rear wheels, a gear case connected to the driven rear wheel, a strut extending from said gear case to a point on said axle near to the other of said rear wheels.

7. In a motor vehicle, a chassis, two rear wheels, an axle common to both said wheels, an engine, a gear box connected to the driven of said rear wheels, means for transmitting motion from said engine to said rear wheels, a radius rod connected to said gear box and to a point on the chassis near to the side of the same away from said driven wheel.

8. In a motor vehicle, a chassis, two rear wheels, an axle common to both said wheels, a hinged bracket on the front of said chassis, triangularly-connected members forming said bracket, a front wheel connected to said hinged bracket and in substantial alinement with one of the rear wheels, a depending member rigidly connected to said hinged bracket, spring means between said depending member and a point on said chassis, and spring means connecting said axle to said chassis.

9. In a motor vehicle, a chassis, triangularly-united members constituting said chassis, two rear wheels rotatable about a common axis, a front wheel disposed offset relative to the chassis and in alinement with one of the rear wheels, a bracket carrying said front wheel, triangularly-associated members providing said bracket, and an engine mounted on said chassis to one side of the same and between said front wheel and the rear wheel in alinement therewith.

10. In a motor vehicle, a chassis, two rear wheels rotatable about coincident axes, a front wheel in substantial alinement with one of said rear wheels, an engine located to one side of said chassis, driving means from said engine to the rear wheel in alinement with said front wheel, a gear box for a portion of said driving means associated with said last named rear wheel, and a radius rod connected to said gear box and to a point on the chassis near to the side of the same away from said driven wheel.

11. In a motor vehicle, two side frames, one side frame being composed of straight members united in triangular relation, the other side frame being composed of straight members combined in triangular relationship, and an engine casting built in said frame and forming an integral whole with said last named members.

12. In a motor vehicle, a chassis built up of straight members in triangular relationship, a structure hinged to the front of said chassis at two points, said structure being composed also of straight members in triangular relationship, spring means between said structures and said chassis, a front wheel connected to said structure and located at one side of the vehicle, two rear wheels, an axle common to the said rear wheels and tension springs between said axle and said chassis.

In testimony whereof, I affix my signature.

ALFRED ANGAS SCOTT.